(12) United States Patent
Griffin et al.

(10) Patent No.: US 7,468,660 B2
(45) Date of Patent: Dec. 23, 2008

(54) CARGO SENSING APPARATUS FOR A CARGO CONTAINER

(75) Inventors: Dennis P. Griffin, Noblesville, IN (US); William W. Fultz, Carmel, IN (US)

(73) Assignee: Delphi Technologies, Inc., Troy, MI (US)

( * ) Notice: Subject to any disclaimer, the term of this patent is extended or adjusted under 35 U.S.C. 154(b) by 626 days.

(21) Appl. No.: 11/243,011

(22) Filed: Oct. 4, 2005

(65) Prior Publication Data

US 2007/0075853 A1  Apr. 5, 2007

(51) Int. Cl.
*G08B 21/00* (2006.01)
(52) U.S. Cl. .................. 340/540; 340/425.5; 340/545.3
(58) Field of Classification Search ................ 340/540, 340/425.5, 541, 545.3, 555–557, 565, 585; 250/200, 227.14, 221; 356/429, 431
See application file for complete search history.

(56) References Cited

U.S. PATENT DOCUMENTS

| | | | |
|---|---|---|---|
| 3,574,469 A * | 4/1971 | Emerson | 356/431 |
| 5,493,112 A * | 2/1996 | Welch | 250/221 |
| 5,493,517 A | 2/1996 | Frazier | |
| 5,910,767 A * | 6/1999 | Frucht | 340/557 |
| 5,917,433 A | 6/1999 | Keillor et al. | |
| 6,437,702 B1 | 8/2002 | Ragland et al. | |
| 6,919,803 B2 | 7/2005 | Breed | |
| 7,098,784 B2 * | 8/2006 | Easley et al. | 340/585 |
| 7,176,793 B1 * | 2/2007 | Hummer | 340/541 |
| 7,339,460 B2 * | 3/2008 | Lane et al. | 340/425.5 |
| 2004/0140886 A1 | 7/2004 | Cleveland et al. | |
| 2004/0233041 A1 * | 11/2004 | Bohman et al. | 340/425.5 |
| 2005/0057344 A1 * | 3/2005 | Davis et al. | 340/425.5 |
| 2005/0195101 A1 * | 9/2005 | Stevens et al. | 340/545.3 |
| 2008/0094212 A1 * | 4/2008 | Breed | 340/541 |

* cited by examiner

*Primary Examiner*—John A Tweel, Jr.
(74) *Attorney, Agent, or Firm*—Douglas D. Fekete

(57) ABSTRACT

A cargo sensing apparatus for a cargo container such as a semi-trailer includes a laser line scanning unit. In a preferred embodiment, first and second laser line generators are mechanically scanned in synchronism with a solid-state imager to identify and map the contents of the cargo container. The map is analyzed to detect cargo items stored in the container, and the cargo status is reported to a remote location.

10 Claims, 6 Drawing Sheets

CARGO SENSING APPARATUS FOR A CARGO CONTAINER

TECHNICAL FIELD

The present invention relates to a system for sensing the presence of cargo stored in a container such as a semi-trailer.

BACKGROUND OF THE INVENTION

Various systems have been proposed for sensing the interior volume of freight cars and trailers for cargo, and for transmitting information gleaned from the sensors to a remote site such as an asset management center. See, for example, the U.S. Pat. No. 6,437,702 to Ragland et al., the U.S. Pat. No. 6,919,803 to Breed and the U.S. Patent Application Publication No. 2004/0140886 to Cleveland et al. The sensors proposed in these patent documents range from simple ultrasonic transceivers to laser radar sensors. But in practice, sophisticated approaches using laser radar sensors are cost prohibitive, and economical approaches using ultrasonic and other fixed beam sensors fail to provide sufficiently detailed and reliable information. Accordingly, what is needed is an improved cargo sensing apparatus that provides a sufficient level of detail in a cost effective manner.

SUMMARY OF THE INVENTION

The present invention provides an improved cargo sensing apparatus for a cargo container such as a semi-trailer, including a ceiling-mounted laser scanner. In a preferred embodiment, the sensing apparatus includes first and second laser line generators that are mechanically scanned in synchronism with a solid-state imager to identify and map the contents of the cargo container. The map is analyzed to detect cargo items stored in the container, and the cargo status is reported to a remote location.

DESCRIPTION OF THE PREFERRED EMBODIMENT

Figure 1:
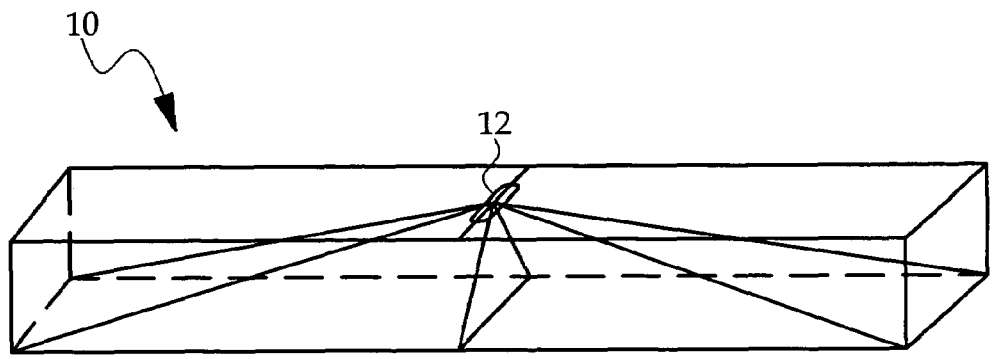
FIG. 1 is a diagram of a scanning laser cargo sensing apparatus according to this invention.

Referring to FIG. 1, the reference numeral 10 generally designates a closed cargo container such as a semi-trailer equipped with a laser scanning unit 12 according to this invention. In the illustrated embodiment, the scanning unit 12 is mounted on the ceiling of the container 10, approximately at the fore-aft midpoint of the container volume so that the scanning distances to the front and rear of the container 10 will be essentially equivalent. Although the illustrated configuration can adequately scan a container that is 60-feet in length, a second ceiling-mounted scanning unit may be added to minimize range requirements and occlusions, if desired. Alternatively, one or more scanning units could be mounted on a side wall of the container, if desired.

Referring to FIG. 1, the ceiling-mounted scanning unit 12 mechanically scans a visible or infrared laser line over a field-of-view that encompasses the entire interior floor area of the container 10. The reflected laser light is received by the scanning unit 12 and used to construct a map of the container volume for determining, for example, whether any cargo is present, or whether cargo meeting a certain description is present.

Figure 2A:
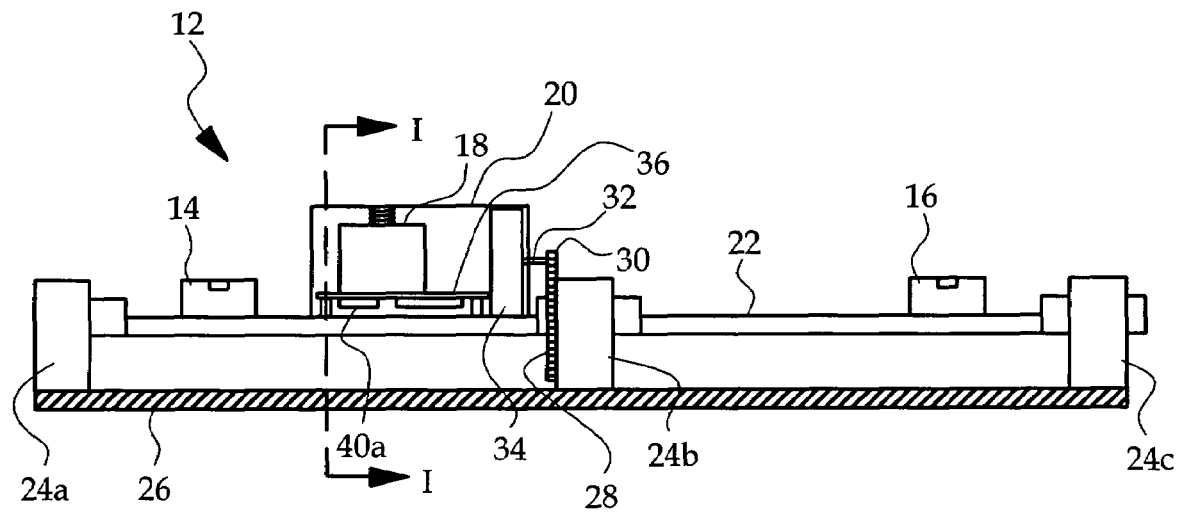
FIG. 2A is a side view of sensing apparatus of FIG. 1.
Figure 2B:
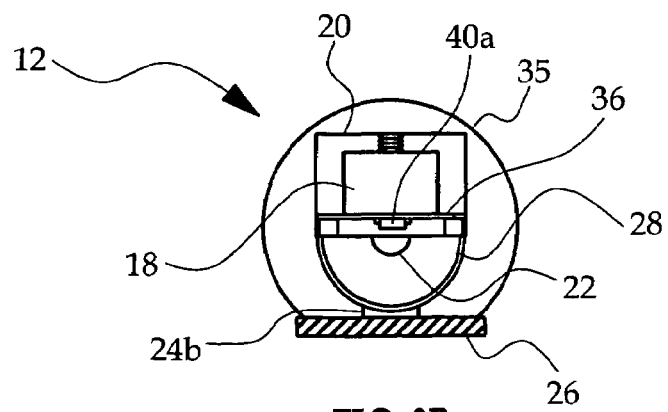
FIG. 2B is a cross-sectional view of the sensing apparatus of FIG. 2A, taken along lines I-I.

FIGS. 2A and 2B respectively depict side and cross-sectional end views of the scanning unit 12 of FIG. 1. In the illustrated embodiment, the scanning unit 12 includes first and second visible or infrared laser line generators 14, 16 and a single solid-state imager 18 such as a CMOS or CCD camera chip. The laser line generators 14, 16 and a housing 20 including the imager 18 are secured to a shaft 22 having an axis that is parallel to the lines of light emitted by the laser line generators 14, 16. The shaft 22 is rotatably supported at its ends and mid-section by a set of support blocks 24a, 24b, 24c, which in turn are mounted on a base plate 26. The base plate 26 is designed to be bolted or otherwise secured to the ceiling or a side wall of container 10 so that the aforementioned components extend into the container volume as illustrated in FIG. 1. A stationary gear or gear section 28 concentric with the shaft 22 is affixed to one side of the support block 24b located at the mid-section of shaft 22, and a worm gear 30 supported on a shaft 32 continuously engages the teeth of stationary gear 28. The worm gear shaft 32 passes through a wall 20a of housing 20 and is affixed to the armature of a stepper motor 34 mounted in the housing 20 with imager 18. In this way, activation of the stepper motor 34 rotates the worm gear 30 to produce synchronous rotation of the laser line generators 14, 16 and the imager 18 about the shaft 22. As illustrated in FIG. 2B (but omitted in FIG. 2A), a tubular transparent shield 35 affixed to the base plate 26 envelops and protects the aforementioned components of scanning unit 12.

Control of the laser line generators 14, 16, the imager 18 and stepper motor 34 is coordinated by an electronic controller 40, described below in reference to FIG. 3. As illustrated in FIG. 2A, circuit components 40a of the controller 40 are mounted along with imager 18 on a printed circuit board 36 within the housing 20, simplifying electrical connections among controller 40, imager 18 and stepper motor 34. Electrical connections between the controller 40 and the laser line generators 14, 16 may be routed through the shaft 22 if hollow. Electrical power for operating the scanning unit 12 is preferably provided by a rechargeable battery onboard the cargo container 10. A power cable (not shown) from the rechargeable battery may be routed directly to the controller 40, or through the shaft 22, if hollow.

Figure 3:
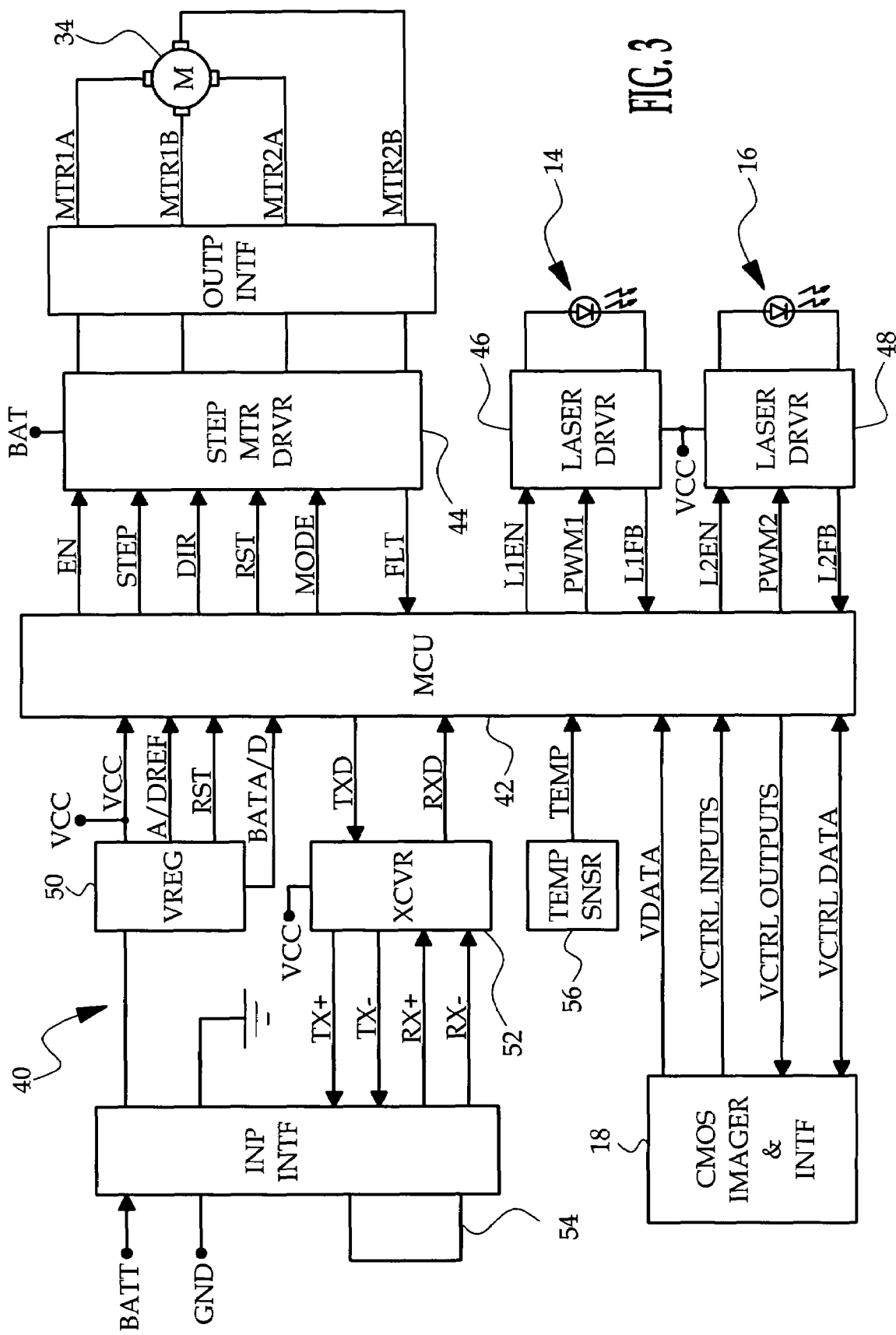
FIG. 3 is a block diagram of an electronic controller integrated into the sensing apparatus of FIGS. 2A-2B.

Referring to FIG. 3, the electronic controller 40 principally includes a microcomputer (MCU) 42, drivers 44, 46, 48 for the stepper motor 34 and laser line generators 14, 16, a voltage regulator (VREG) 50 and a transceiver (XCVR) 52 with external antenna 54. A temperature sensor 56 is also included to enable temperature compensation of the imager 18 and laser line generator interfaces. The voltage regulator 50 provides an interface between the onboard battery and microcomputer 42, and microcomputer 42 controls the operation of stepper motor 34 and laser line generators 14, 16. The microcomputer 42 processes video data obtained from imager 18 to determine if cargo is present in cargo container 10, and activates transceiver 52 to transmit cargo-related data to a remote location. The transceiver 52 may also be used to initiate cargo scanning, either from a remote location or from another sensor module (such as a door sensor) on the cargo container 10.

In general, the laser line generators 14 and 16 are individually and selectively activated at various scanning angles of the scanning apparatus 12 to emit lines of visible or infrared laser light that traverse the interior volume of the container 10, and the imager 18 receives reflected laser light energy from each of the laser line generators 14, 16. As the shaft 22 is rotated by stepper motor 34, the lines of laser light emitted by laser line generators 14 and 16 are swept across the interior volume of the container 10. The microcomputer 42 processes the imager data to form a target map, and analyzes the target map to detect cargo items within the container volume, as well as the range or distance between the scanner apparatus 12 and each detected cargo item. The range information is determined using the relationship of similar triangles defined in part by the distance between the imager 18 and the respective laser line generators 14 and 16. The distance is optimized in the case of laser line generator 14 for short-to-medium range objects, and in the case of laser line generator 16 for medium-to-long range objects. Accordingly, the laser line generator 14 is closer to imager 18 than is the laser line generator 16. Target vectors containing object position and range data obtained from both laser line generators 14, 16 are correlated to form a target map of the container volume, and the microcomputer 42 analyzes the target map to determine the status (empty vs. not-empty, for example) of the container volume. The status is then reported to a remote location such as an asset management center or the like.

Figure 4:
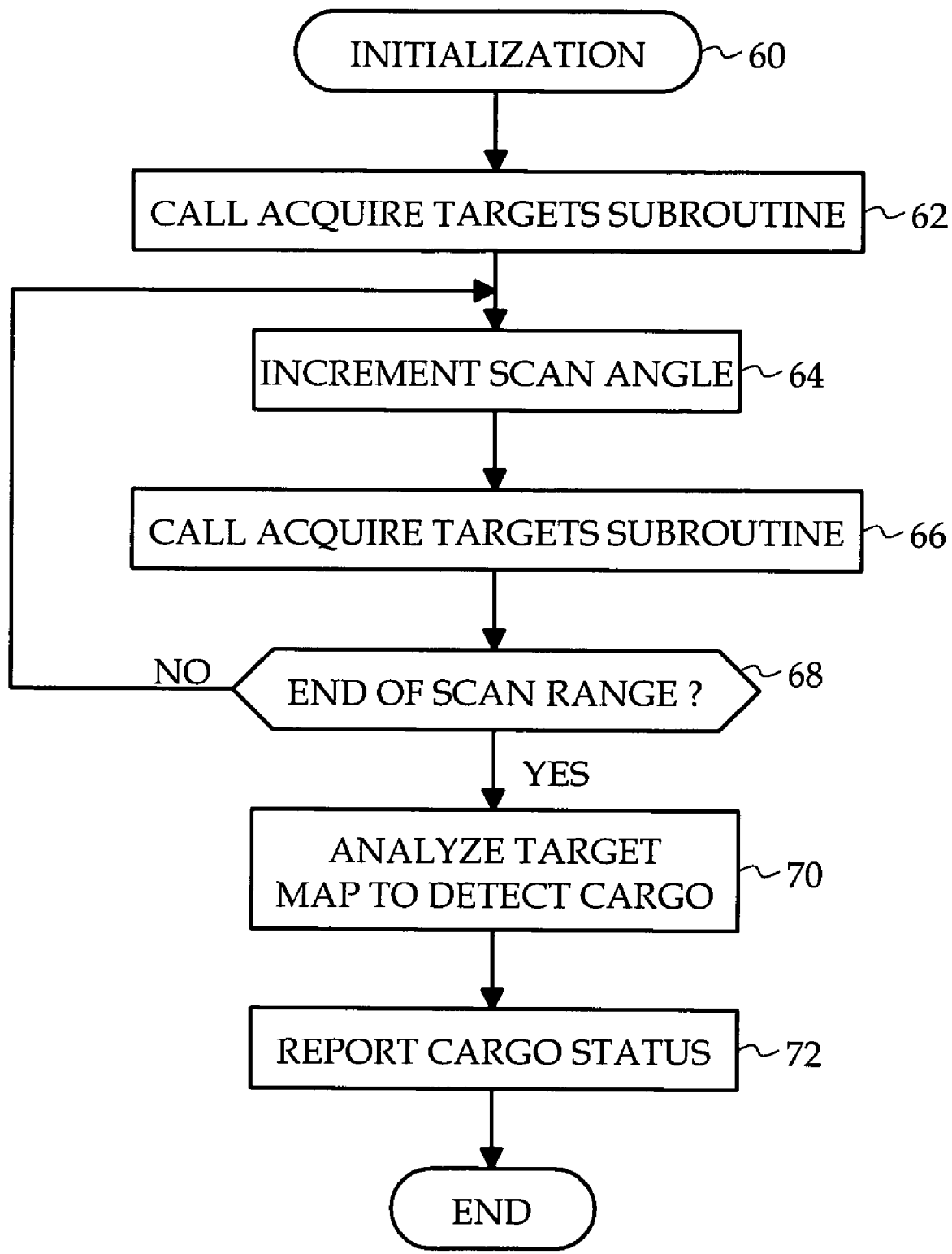
FIG. 4 is a flow diagram representative of an overall software routine executed by the electronic controller of FIG. 3 for operating the sensing apparatus of FIGS. 2A-2B.

FIGS. 4-7 depict flow diagrams that are representative of a software routine resident within microcomputer 42 and selectively executed by microcomputer 42 for carrying out the above-described and other related functions. The flow diagram of FIG. 4 depicts a main loop of the routine, whereas the flow diagrams of FIGS. 5-7 detail a target acquisition subroutine called by the main loop.

Referring to the main loop flow diagram of FIG. 4, the block 60 designates initialization instructions executed each time scanning of the cargo container 10 is requested. These instructions may include, for example, diagnostic routines and a routine for rotating the shaft 22 to a specified starting position. Following initialization, the block 62 is executed to acquire target (cargo) data at current scan angle; in the illustrated embodiment, this involves calling the "Acquire Targets" subroutine, described in the further detail by the flow diagrams of FIGS. 5-7. Following execution of the Acquire Targets subroutine, the blocks 64 and 66 are executed to activate the stepper motor 34 for rotating the worm gear shaft 32 by one or more incremental steps and again calling the Acquire Targets subroutine to acquire target data. As indicated by block 68, this process of incrementing the scan angle and acquiring target data is repeated until the full scanning range of the scanning unit 12 has been achieved. The subroutines called by the main flow diagram store the acquired target data in a target map, and when an entire scan of the cargo container 10 is completed, the microcomputer executes block 70 to analyze the target map to identify non-container objects within the scanned volume. To this end, a scan of the empty container volume may be stored as a reference target map. Once the cargo status (empty vs. not-empty, for example) is determined, the block 72 is executed to activate transceiver 52 for reporting the cargo status.

Figure 5:
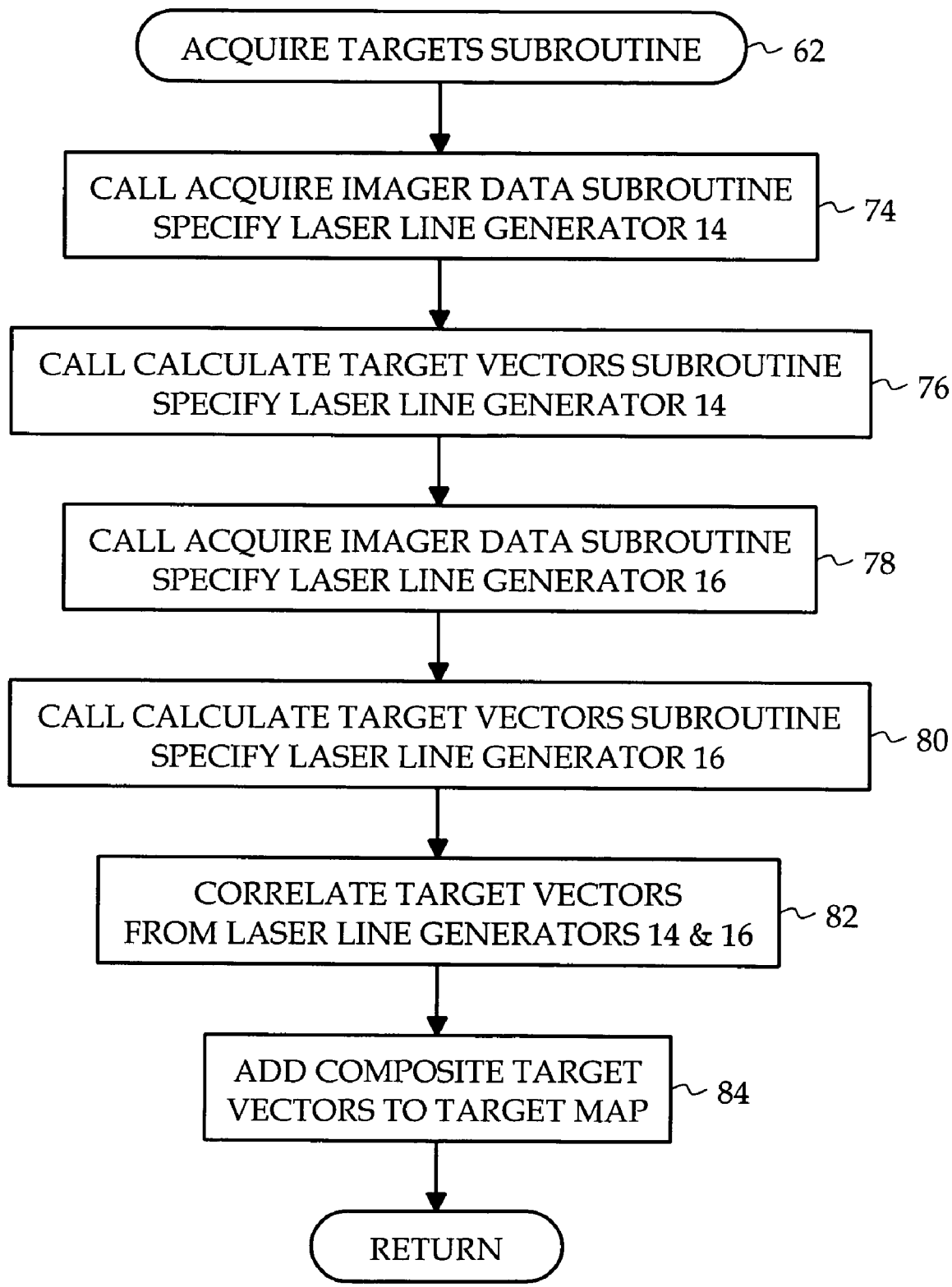
FIG. 5 is a flow diagram of a software routine called by the flow diagram of FIG. 4 to identify and store target vectors.

The flow diagram of FIG. 5 summarizes the Acquire Targets subroutine called by blocks 62 and 66 of the main loop flow diagram of FIG. 4. Referring to FIG. 5, blocks 74 and 76 call subroutines for acquiring target data and calculating corresponding target vectors using laser line generator 14, and blocks 78 and 80 call subroutines for acquiring target data and calculating corresponding target vectors using laser line generator 16. In each case, the subroutine for acquiring target data is detailed in the flow diagram of FIG. 6, and the subroutine for calculating corresponding target vectors is detailed in the flow diagram of FIG. 7. After blocks 74-80 have been executed, the blocks 82 and 84 are executed to correlate the target vectors calculated at blocks 76 and 80 and to add the composite target vectors to the target map for the container volume.

Figure 6:
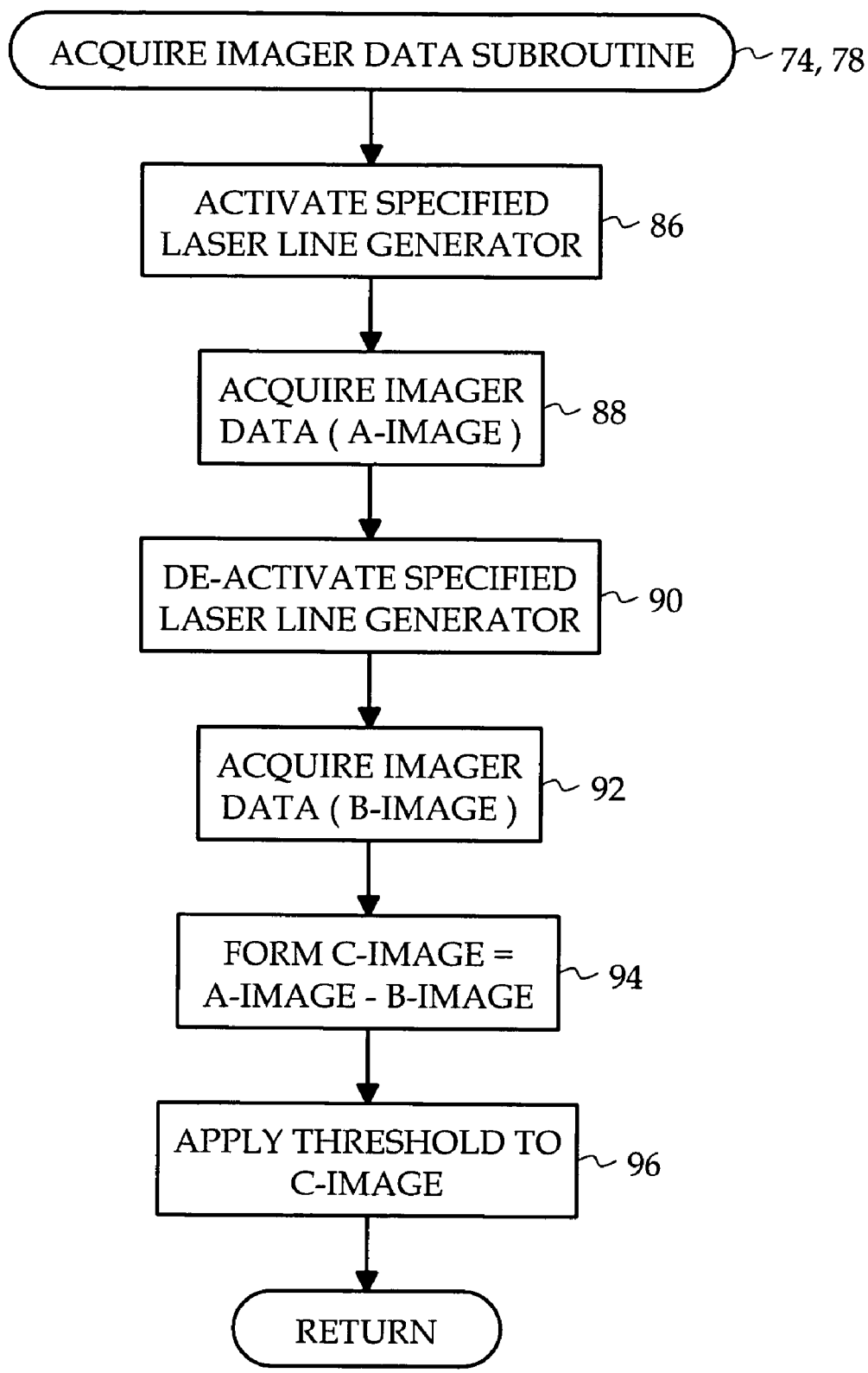
FIG. 6 is a flow diagram of a software routine called by the flow diagram of FIG. 5 to acquire imager target data.

Referring to FIG. 6, the subroutine for acquiring target data with a specified laser line generator 14, 16 begins by activating the specified laser line generator to actively illuminate the container volume at the current scan angle (block 86) and acquiring video data (A-IMAGE) developed by imager 18 during the active illumination (block 88). The specified laser line generator is then deactivated (block 90) and the data (B-IMAGE) developed by imager 18 with no active illumination is acquired (block 92). The block 94 subtracts the ambient illumination data (i.e., the B-IMAGE) from the active illumination data (i.e., the A-IMAGE) to form a C-IMAGE that contains only reflected laser light energy, and the block 96 performs a thresholding operation on the C-IMAGE to suppress spurious data.

Figure 7:
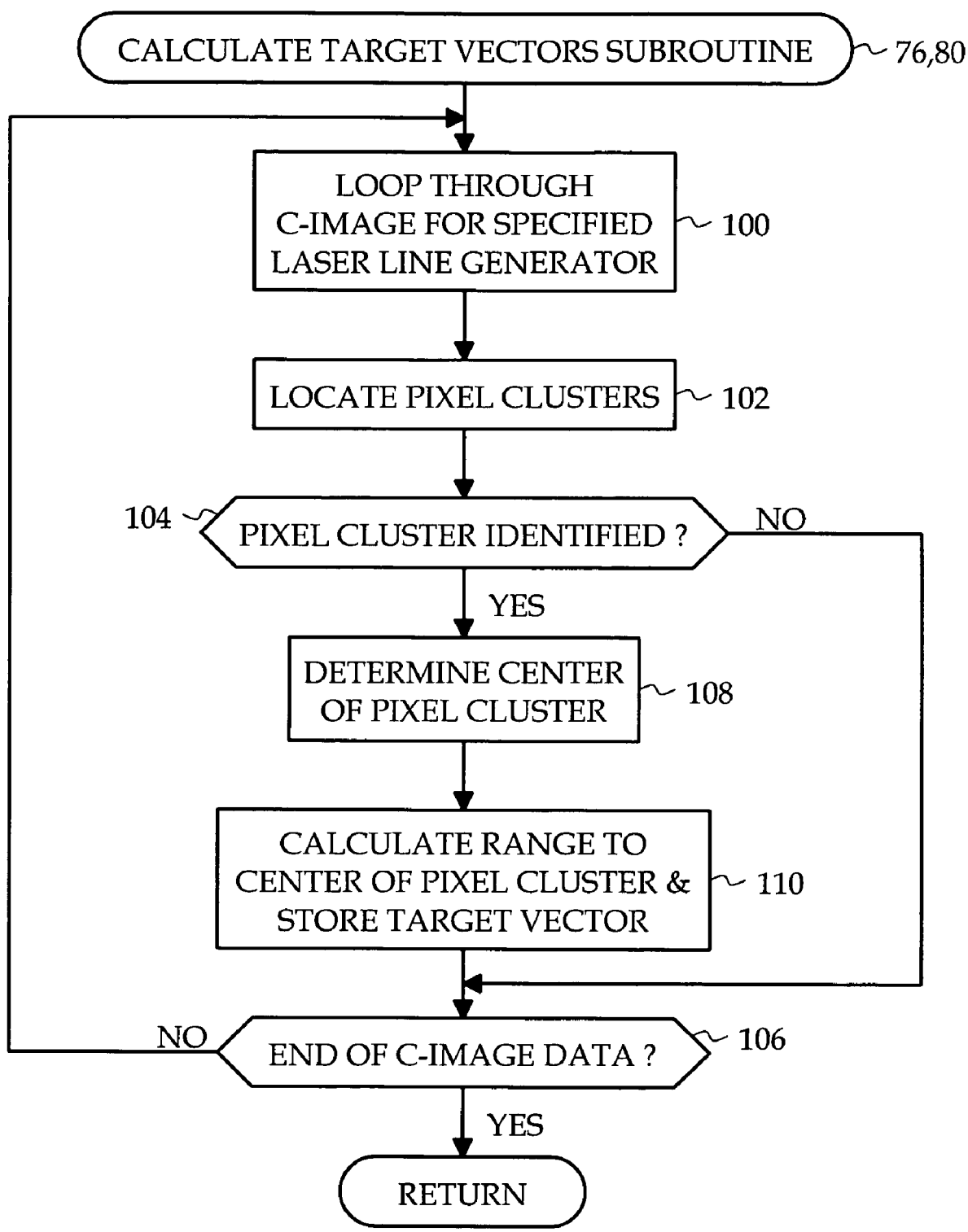
FIG. 7 is a flow diagram of a software routine called by the flow diagram of FIG. 5 to locate, identify and calculate target vectors.

Finally, referring to FIG. 7, the subroutine for calculating target vectors involves processing the imager data accumulated for a specified laser line generator 14, 16 to detect cargo items (targets) and calculate the range to such cargo items. As indicated by blocks 100, 102, 104 and 106, the subroutine scans through the C-IMAGE data developed by the subroutine of FIG. 6 for the specified laser line generator until a pixel cluster representative of a cargo item is identified. If no such pixel cluster is identified, the subroutine is exited. If a pixel cluster is found, the block 108 determines the center of the pixel cluster and the block 110 calculates the range to the determined center. The current scan angle and the calculated range form a target vector and block 110 stores the target vector in a target map for the specified laser line generator. As described above, blocks 82-84 of the Acquire Targets subroutine eventually correlate the target vectors determined using both of the laser line generators 14, 16 to form a set of composite target vectors, which define the target map for the container volume.

In summary, the apparatus of the present invention provides a cost effective approach for thoroughly scanning the entire interior volume of a cargo container and accurately determining if cargo is present. Of course, other more detailed information about the cargo can also be determined and reported if desired.

While the present invention has been described with respect to the illustrated embodiment, it is recognized that numerous modifications and variations in addition to those mentioned herein will occur to those skilled in the art. For example, the scanning unit for certain applications may require only a single laser line generator. Furthermore, it would be possible to duplicate the functionality of the illustrated embodiment with a single laser line generator by adding a translational mechanism for adjusting the separation distance between the imager and the laser line generator. Accordingly, it is intended that the invention not be limited to the disclosed embodiment, but that it have the full scope permitted by the language of the following claims.

The invention claimed is:

1. Apparatus for detecting cargo in an interior volume of a closed container, comprising:
    at least one laser generator disposed on a ceiling or side wall of said container for emitting a line of visible or infrared laser light that traverses the interior volume of said container;
    a solid state imaging device displaced from said laser generator along an axis parallel to the emitted line of laser light for receiving reflected laser light;
    scanning means for producing synchronous rotation of said laser generator and said imaging device about said axis so that the line of laser light emitted from said laser generator sweeps across the interior volume of said container; and
    data processing means responsive to video data produced by said imaging device for mapping the interior volume of said container and reporting a cargo status of said container.

2. The apparatus of claim 1, wherein said scanning means includes a rotary shaft having an axis parallel to said emitted line of laser light, said at least one laser generator and said imaging device being affixed to said shaft.

3. The apparatus of claim 2, comprising:
    a stepper motor affixed to said rotary shaft for producing rotation of said shaft for sweeping said line of laser light across the interior volume of said container.

4. The apparatus of claim 3, wherein said imaging device, said data processing means and said stepper motor are disposed in a housing that is affixed to said rotary shaft.

5. The apparatus of claim 3, comprising:
    a first gear element that is rotated by said stepper motor; and
    a second gear element affixed to said container and in meshing engagement with said first gear element.

6. The apparatus of claim 1, further comprising:
    a protective cover that envelops said laser line generator, said imaging device, said scanning means and said data processing means.

7. The apparatus of claim 1, comprising:
    first and second laser line generators displaced from said imaging device along said axis by different distances.

8. The apparatus of claim 7, wherein said data processing means detects a target and computes first and second ranges to the detected target based in part on the distances by which said first and second laser line generators are displaced from said imaging device.

9. The apparatus of claim 8, wherein said data processing means correlates said first and second ranges in mapping the interior volume of said container.

10. The apparatus of claim 1, wherein the reported cargo status indicates whether said container is empty or not-empty.

* * * * *